(12) United States Patent
Kobayashi

(10) Patent No.: US 11,749,837 B2
(45) Date of Patent: Sep. 5, 2023

(54) BATTERY PACK AND PRODUCTION METHOD FOR BATTERY PACK

(71) Applicant: TOYOTA JIDOSHA KABUSHIKI KAISHA, Toyota (JP)

(72) Inventor: Keiichiro Kobayashi, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 17/119,550

(22) Filed: Dec. 11, 2020

(65) Prior Publication Data

US 2021/0257661 A1 Aug. 19, 2021

(30) Foreign Application Priority Data

Feb. 19, 2020 (JP) .................... 2020-026128

(51) Int. Cl.
| | |
|---|---|
| *H01M 10/0566* | (2010.01) |
| *H01M 10/04* | (2006.01) |
| *H01M 4/13* | (2010.01) |
| *H01M 50/204* | (2021.01) |

(Continued)

(52) U.S. Cl.
CPC ......... *H01M 10/0566* (2013.01); *H01M 4/13* (2013.01); *H01M 10/0431* (2013.01); *H01M 10/647* (2015.04); *H01M 50/204* (2021.01); *H01M 50/40* (2021.01)

(58) Field of Classification Search
CPC ............ H01M 10/0566; H01M 10/52; H01M 10/0431; H01M 10/647; H01M 8/04302; H01M 8/0438; H01M 8/04432; H01M 8/04425; H01M 50/105; H01M 50/204; H01M 40/40; H01M 4/043; H01M 4/13
See application file for complete search history.

(56) References Cited

U.S. PATENT DOCUMENTS

2015/0340673 A1* 11/2015 Joswig ............. H01M 50/3425
429/56
2018/0309103 A1* 10/2018 Kobayashi ........ H01M 10/0481
(Continued)

FOREIGN PATENT DOCUMENTS

| CN | 103283056 A | 9/2013 |
|---|---|---|
| CN | 106133951 A | 11/2016 |
| CN | 108735937 A | 11/2018 |

(Continued)

*Primary Examiner* — Matthew T Martin
*Assistant Examiner* — Ankith R Sripathi
(74) *Attorney, Agent, or Firm* — Oliff PLC

(57) ABSTRACT

In a battery pack disclosed herein, a plurality of single cells are aligned in an alignment direction. In this battery pack, a spacer is disposed in a gap between adjacent ones of the single cells, and a convex rib is formed on the spacer. In a flat surface of each single cell, a region where the rib is in contact is a confined region, and a region where the rib is not in contact is a non-confined region. In the non-confined region within the battery case, an internal pressure adjusting bag filled with a gas is housed. In addition, gas supplying means (soluble part) for supplying the gas held in the internal pressure adjusting bag to an internal space of the battery case is provided. Thus, a negative pressure within the single cell is removed, and deterioration of high-rate performance otherwise caused by outflow of an electrolyte can be prevented.

5 Claims, 10 Drawing Sheets

(51) Int. Cl.
*H01M 50/40* (2021.01)
*H01M 10/647* (2014.01)

(56) References Cited

U.S. PATENT DOCUMENTS

| | | | |
|---|---|---|---|
| 2021/0098842 A1* | 4/2021 | Nowak | H01M 10/625 |
| 2021/0391628 A1* | 12/2021 | Hattendorff | H01M 50/383 |

FOREIGN PATENT DOCUMENTS

| | | | | |
|---|---|---|---|---|
| DE | 10/20192147550 | * | 9/2019 | H01M 50/204 |
| DE | 102019214755 | * | 9/2019 | H01M 50/204 |
| JP | 2015-079722 A | | 4/2015 | |
| JP | 2015-230824 A | | 12/2015 | |
| JP | 2018-181765 A | | 11/2018 | |
| JP | 2019-087371 A | | 6/2019 | |
| WO | 2012/090048 A1 | | 7/2012 | |
| WO | 2015/136937 A1 | | 9/2015 | |

* cited by examiner

BATTERY PACK AND PRODUCTION METHOD FOR BATTERY PACK

CROSS-REFERENCE TO RELATED APPLICATION

This application claims priority to Japanese Patent Application No. 2020-026128 filed on February 19, 2020, incorporated herein by reference in its entirety.

BACKGROUND

1. Technical Field

The disclosure relates to a battery pack and a production method for the same. Specifically, it relates to a battery pack including a plurality of nonaqueous electrolyte secondary batteries each as a single cell, and a method for producing the battery pack.

2. Description of Related Art

In recent years, nonaqueous electrolyte secondary batteries (such as lithium ion secondary batteries) have been used as portable power sources for personal computers, mobile devices and the like, and as power supplies for driving various vehicles such as an electric vehicle (EV), a hybrid vehicle (HV), and a plug-in hybrid vehicle (PHV), and the like. Such a nonaqueous electrolyte secondary battery has, for example, a structure in which an electrode assembly including a positive electrode and a negative electrode, and a nonaqueous electrolyte (hereinafter sometimes referred to simply as an "electrolyte") are housed in a battery case. Examples of such a nonaqueous electrolyte secondary battery are disclosed in Japanese Unexamined Patent Application Publication No. 2015-79722, Japanese Unexamined Patent Application Publication No. 2019-87371, and Japanese Unexamined Patent Application Publication No. 2015-230824.

In a power storage device (battery) described in JP 2015-79722 A, a gas sealed bag containing a gas sealed therein is disposed inside a package (battery case) together with a power generation element (electrode assembly). In such a battery, when a reduced pressure environment is caused inside the package, the gas sealed bag expands to apply a pressure to the electrode assembly, which inhibits increase in a distance between electrodes. Besides, JP 2019-87371 A discloses a technique in which a bag containing an electrolyte is disposed within a housing, and the bag is burst after sealing the housing. This technique allows the electrolyte to be injected into the housing without the electrolyte adhering to a connecting portion between the housing and a lid. In an electrode structure described in JP 2015-230824 A, a separator disposed between a positive electrode and a negative electrode is formed in the shape of a bag, and the negative electrode and a nonaqueous electrolyte are housed in the bag-shaped separator. Thus, the electrolyte is inhibited from moving away from the negative electrode, and increase of internal resistance can be inhibited.

This type of nonaqueous electrolyte secondary battery is used in the form of a battery pack in some cases. Such a battery pack is constructed by aligning a plurality of nonaqueous electrolyte secondary batteries (single cells) to be adjacent to one another along a prescribed alignment direction and confining the plurality of single cells along the alignment direction. Besides, in this type of battery pack, a spacer is disposed between single cells adjacent to each other for purposes of adjustment of a confining pressure applied to each single cell and improvement of heat radiation efficiency.

In the battery pack having this structure, a pumping effect due to expansion/shrinkage of the electrode and volume expansion of the electrolyte occurs during charge/discharge, and the electrolyte is squeezed out of the electrode assembly in some cases. As a result, concentration unevenness of a charge carrier and electrolyte shortage occur within the electrode assembly, and there is a risk that high-rate performance may be deteriorated. In order to prevent outflow of the electrolyte caused by the pumping effect, in a battery pack described in Japanese Unexamined Patent Application Publication No. 2018-181765, a pressing portion, that is, a projection for pressing a part of a reaction portion (core part) of an electrode assembly, is formed on a spacer disposed between single cells. In this battery pack, differently from the technique for applying a uniform confining pressure to the electrode assembly included in a single cell, a pressed portion (in a confined region) to be pressed by the pressing portion and a non-pressed portion (in a non-confined region) not to be pressed by the pressing portion are formed on the electrode assembly. Here, the pressed portion (in the confined region) functions as a stopper for regulating movement of the electrolyte as well as the non-pressed portion (in the non-confined region) functions as an electrolyte holding space, and therefore, the deterioration of the high-rate performance otherwise caused by outflow of the electrolyte to the outside of the electrode assembly can be prevented.

SUMMARY

In the field of nonaqueous electrolyte secondary batteries in recent years, there are increasing demands for construction of battery packs having higher high-rate performance in accordance with spread of the nonaqueous electrolyte secondary batteries. In order to meet the demands, the present inventors have made various experiments and examinations on a technique capable of more suitably preventing outflow of an electrolyte to the outside of an electrode assembly. As a result of these experiments and examinations, the present inventors have found that there is another cause of the outflow of an electrolyte to the outside of an electrode assembly in addition to the expansion/shrinkage of an electrode and the volume expansion of an electrolyte described above.

Specifically, in general production process of a nonaqueous electrolyte secondary battery, in order to permeate an electrolyte into an electrode assembly, the electrolyte is injected after reducing a pressure inside a battery case, and then the battery case is sealed. At this point, if the battery case is sealed without removing a negative pressure after the injection of the electrolyte, self-confinement due to shrinking the electrode assembly by the negative pressure occurs. In this case, the amount of the electrolyte that can be held within the electrode assembly (between a positive electrode and a negative electrode) is reduced, and therefore, even when an electrolyte holding space is formed in the electrode assembly as described in JP 2018-181765 A, the amount of the electrolyte held in the entire electrode assembly is reduced, and hence there is a possibility that an effect of improving high-rate resistance cannot be sufficiently exhibited. Besides, the negative pressure can be removed by leaving the battery case opened, after the injection of the electrolyte, for a long period of time (of about 1 hour), but possibilities of production efficiency deterioration and contamination are increased, and hence this method is difficult to employ in the actual production process.

The present disclosure was devised to solve these problems, and an object of the present disclosure is to provide a technique capable of suitably removing a negative pressure within a single cell included in a battery pack for suitably preventing deterioration of high-rate performance otherwise caused by outflow of an electrolyte to the outside of an electrode assembly.

A battery pack disclosed herein includes a plurality of single cells aligned along a prescribed alignment direction with each of the single cells being confined along the alignment direction. Each of the single cells is a nonaqueous electrolyte secondary battery including an electrode assembly and a nonaqueous electrolyte housed in a battery case in a flat rectangular shape. A plate-shaped spacer is disposed in each gap between adjacent ones of the single cells, and a convex rib in contact with a flat surface of the single cell is formed in a part of a surface of the spacer. At this point, a region, in the flat surface of the single cell, where the rib is in contact is a confined region, and a region where the rib is not in contact is a non-confined region. In the battery pack disclosed herein, an internal pressure adjusting bag filled with a gas is housed in the battery case of each of at least some of the plurality of single cells, and the internal pressure adjusting bag is disposed in at least a part of the non-confined region. The battery pack further includes gas supplying device for supplying the gas held in the internal pressure adjusting bag to an internal space of the battery case having been sealed.

The battery pack disclosed herein includes the internal pressure adjusting bag disposed inside the battery case and filled with the gas, and the gas supplying device for supplying the gas held in the internal pressure adjusting bag to the internal space of the battery case having been sealed. Thus, a negative pressure within the battery case can be removed after sealing the battery case, and hence deterioration of electrolyte retention within the electrode assembly otherwise caused by self-confinement can be prevented. In addition, in the battery pack having the aforementioned structure, the spacer having the convex rib is used to form the non-confined region forming an electrolyte holding space within the electrode assembly, and the internal pressure adjusting bag is disposed in a region including the non-confined region. Therefore, the electrolyte retention in the non-confined region can be sufficiently assured. Accordingly, in the battery pack disclosed herein, a negative pressure within the single cell included in the battery pack can be suitably removed, and deterioration of high-rate performance otherwise caused by outflow of the electrolyte to the outside of the electrode assembly can be more suitably prevented.

In one aspect of the battery pack disclosed herein, the gas supplying means is a soluble part that is formed in at least a part of the internal pressure adjusting bag, and is made of a material soluble in the nonaqueous electrolyte, and a redundant electrolyte not permeating into the electrode assembly is present between the electrode assembly and the battery case.

For the gas supplying device used in the battery pack disclosed herein, any of various structures can be employed. An example of the gas supplying device is a structure in which the soluble part soluble in the nonaqueous electrolyte is formed in the internal pressure adjusting bag, and the soluble part is dissolved in the redundant electrolyte present outside the electrode assembly. When this structure is employed to dissolve the soluble part after sealing the battery case, the gas is suitably supplied outside the internal pressure adjusting bag to remove a negative pressure within the battery case.

In another aspect of the battery pack disclosed herein, the gas supplying device is a gas permeable part that is formed in at least a part of the internal pressure adjusting bag, and is made of a material having gas permeability.

Another example of the gas supplying device includes a structure in which the gas permeable part having gas permeability is formed in the internal pressure adjusting bag. When this structure is employed, the gas held in the internal pressure adjusting bag is gradually released through the gas permeable part, and hence, a negative pressure within the battery case can be removed before the battery pack having been produced is distributed/used.

In another aspect of the battery pack disclosed herein, the gas supplying device is a projection having a sharp tip formed on an outer surface of the electrode assembly facing the internal pressure adjusting bag.

Another example of the gas supplying device includes a structure in which a sharp projection capable of breaking the internal pressure adjusting bag is formed on the outer surface of the electrode assembly. When this structure is employed, a region corresponding to the projection is pressed from outside the battery case after sealing the battery case. Thus, the internal pressure adjusting bag is broken such that the gas can be supplied into the battery case to remove a negative pressure.

In another aspect of the battery pack disclosed herein, the gas supplying device is a cleavable part having lower strength than another region of the internal pressure adjusting bag, and a part of the internal pressure adjusting bag is disposed in the confined region.

Another example of the gas supplying device includes a structure in which the cleavable part having lower strength than the other region of the internal pressure adjusting bag is formed. When this structure is employed, and a part of the internal pressure adjusting bag is disposed in the confined region, the internal pressure of the internal pressure adjusting bag is increased in the confining step to cleave the cleavable part, and thus, the gas can be supplied into the battery case.

In a suitable aspect of the battery pack disclosed herein, the gas filled in the internal pressure adjusting bag is an inert gas.

Thus, the gas supplied from the internal pressure adjusting bag can be prevented from deteriorating battery performance.

In a suitable aspect of the battery pack disclosed herein, a water content in the gas filled in the internal pressure adjusting bag is 0.1 $g/m^3$ or less.

Thus, the gas supplied from the internal pressure adjusting bag can be prevented from deteriorating battery performance.

In a suitable aspect of the battery pack disclosed herein, the electrode assembly includes a core part where a positive electrode mixture layer and a negative electrode mixture layer face each other with a separator disposed between the positive electrode mixture layer and the negative electrode mixture layer, and the rib of the spacer is formed in such a manner that the confined region is formed in both edge portions in a width direction of the core part.

When the confined region is thus formed in both edge portions in the width direction of the core part, the electrolyte can be inhibited from flowing out of the core part where charge/discharge is mainly performed, and hence, the deterioration of the high-rate performance can be more suitably prevented.

As another aspect of the techniques disclosed herein, a production method for a battery pack (hereinafter, sometimes simply referred to as the "production method") is provided. By the production method disclosed herein, a battery pack including a plurality of single cells aligned along a prescribed alignment direction with each of the single cells being confined along the alignment direction is produced. The production method includes: a housing step of housing an electrode assembly in a battery case in a flat rectangular shape; a cell forming step of forming each of the single cells by sealing the battery case after evacuating the battery case and injecting a nonaqueous electrolyte into the battery case; an aligning step of alternately aligning a spacer having a convex rib formed in a part of a surface of the spacer and the single cell to bring the rib into contact with a flat surface of the single cell; and a confining step of confining the plurality of single cells along the alignment direction to form, on the flat surface of each of the single cells, a confined region where the rib is in contact, and a non-confined region where the rib is not in contact. In the production method disclosed herein, in the housing step, an internal pressure adjusting bag filled with a gas is housed in the battery case, and the internal pressure adjusting bag is disposed in at least a part of the non-confined region. In addition, a gas supplying step of supplying the gas out of the internal pressure adjusting bag is performed after the cell forming step.

In the production method described above, the internal pressure adjusting bag is disposed in the non-confined region within the battery case in the housing step, and the gas is supplied from the internal pressure adjusting bag after the cell forming step. Thus, a negative pressure in the vicinity of the confined region within the battery case having been sealed can be removed, and hence, the electrolyte is more suitably prevented from flowing out of the electrode assembly. As a result, according to the production method disclosed herein, a battery pack having high high-rate resistance can be produced.

In one aspect of the production method disclosed herein, a soluble part made of a material soluble in the nonaqueous electrolyte is formed in at least a part of the internal pressure adjusting bag, and the gas supplying step is a step, performed in a step subsequent to the cell forming step, of dissolving the soluble part in a redundant electrolyte present between the electrode assembly and the battery case to open the internal pressure adjusting bag.

As described above, when the soluble part is formed in the internal pressure adjusting bag, and the soluble part is dissolved in the nonaqueous electrolyte, the internal pressure adjusting bag can be opened to supply the gas. In this aspect, various conditions can be adjusted such that the internal pressure adjusting bag is opened in the step subsequent to the cell forming step.

In one aspect of the production method disclosed herein, a gas permeable part made of a material having gas permeability is formed in at least a part of the internal pressure adjusting bag, and the gas supplying step is a step, performed in a step subsequent to the cell forming step, of continuously supplying the gas out of the internal pressure adjusting bag through the gas permeable part.

As described above, when the gas permeable part is formed in the internal pressure adjusting bag, the gas can be supplied out of the internal pressure adjusting bag. In this aspect, the gas supplying step of gradually supplying the gas through the gas permeable part to increase the internal pressure of the battery case is continuously performed in the step subsequent to the cell forming step.

In one aspect of the production method disclosed herein, a projection having a sharp tip is formed on an outer surface of the electrode assembly facing the internal pressure adjusting bag, and the gas supplying step is a step, performed in a step subsequent to the cell forming step, of pressing a region corresponding to the projection from outside the battery case to break the internal pressure adjusting bag.

As described above, when the projection having a sharp tip is formed on the electrode assembly facing the internal pressure adjusting bag, and the internal pressure adjusting bag is broken by the projection, the gas can be supplied out of the internal pressure adjusting bag. When this structure is employed, the gas supplying step can be performed at arbitrary timing in the step subsequent to the cell forming step where the battery case is sealed.

In one aspect of the production method disclosed herein, a cleavable part having lower strength than another region of the internal pressure adjusting bag is formed in the internal pressure adjusting bag, and a part of the internal pressure adjusting bag is disposed in the confined region, and the gas supplying step is a step of increasing an internal pressure of the internal pressure adjusting bag in the confining step to cleave the cleavable part.

When this structure is employed, the gas supplying step can be definitely performed in the confining step.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
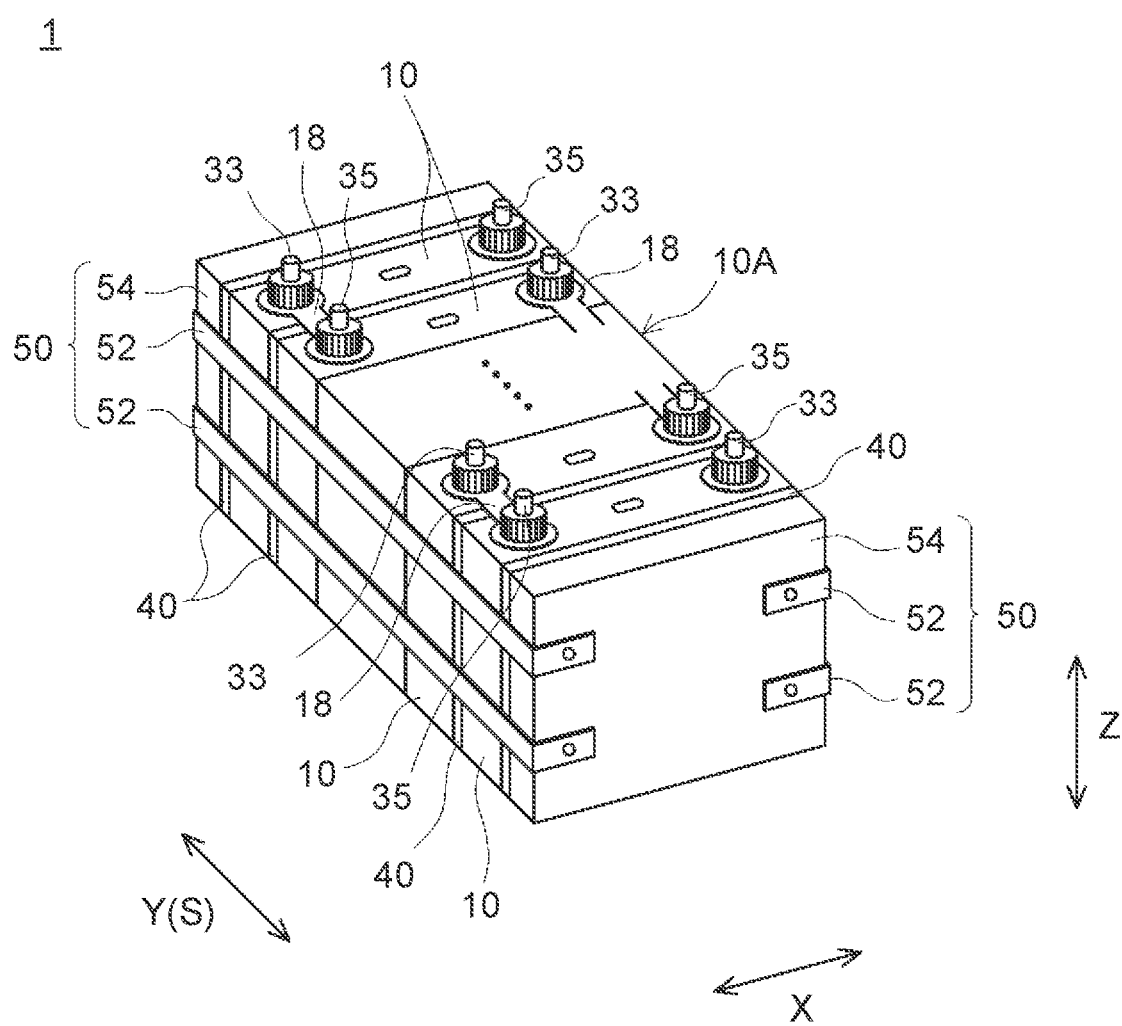
FIG. 1 is a perspective view schematically illustrating a battery pack according to a first embodiment of the present disclosure.

Now, techniques disclosed herein will be described with reference to the accompanying drawings. It is noted that items excluding those mentioned herein particularly but necessary for practicing the techniques disclosed herein (such as materials of an electrode assembly) can be grasped as design items of those skilled in the art based on the prior art of this field.

Besides, in the drawings herein referred to, like reference signs are used for describing members/portions having the same functions. It is noted that a reference sign X in each drawing indicates a "width direction (of a single cell)", a reference sign Y indicates a "depth direction (of a single cell)", and a reference sign Z indicates a "height direction (of a single cell)". These directions are determined for convenience sake in the description, and do not intend to limit the techniques disclosed herein (such as a direction of a battery pack in use). Besides, a dimensional relationship (in length, width, thickness and the like) employed in each drawing does not reflect an actual dimensional relationship.

A. Battery Pack

In one aspect of the techniques disclosed herein, a battery pack is provided. Now, the battery pack herein disclosed will be described by exemplarily describing first to fourth embodiments.

1. First Embodiment

Figure 2:
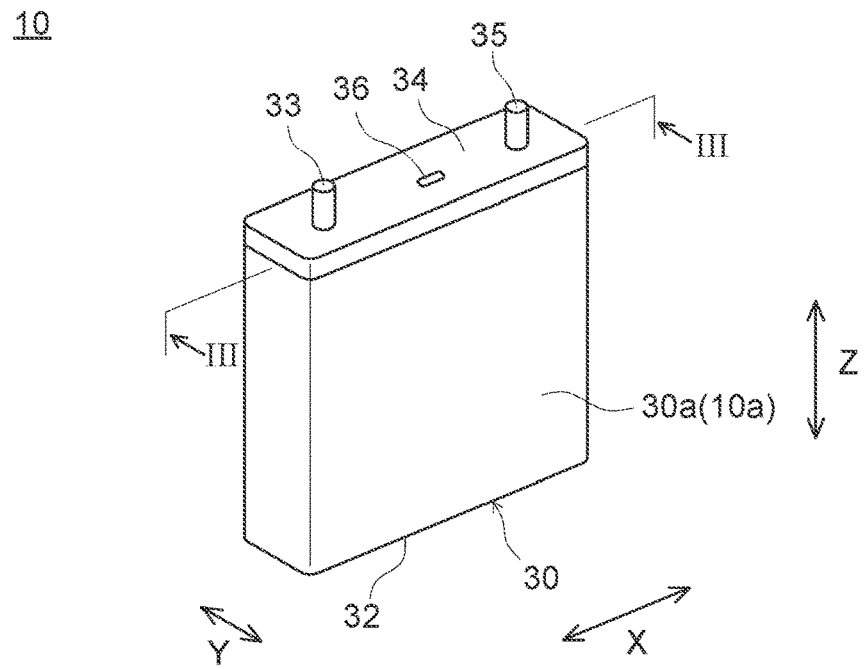
FIG. 2 is a perspective view schematically illustrating a single cell of FIG. 1.
Figure 3:
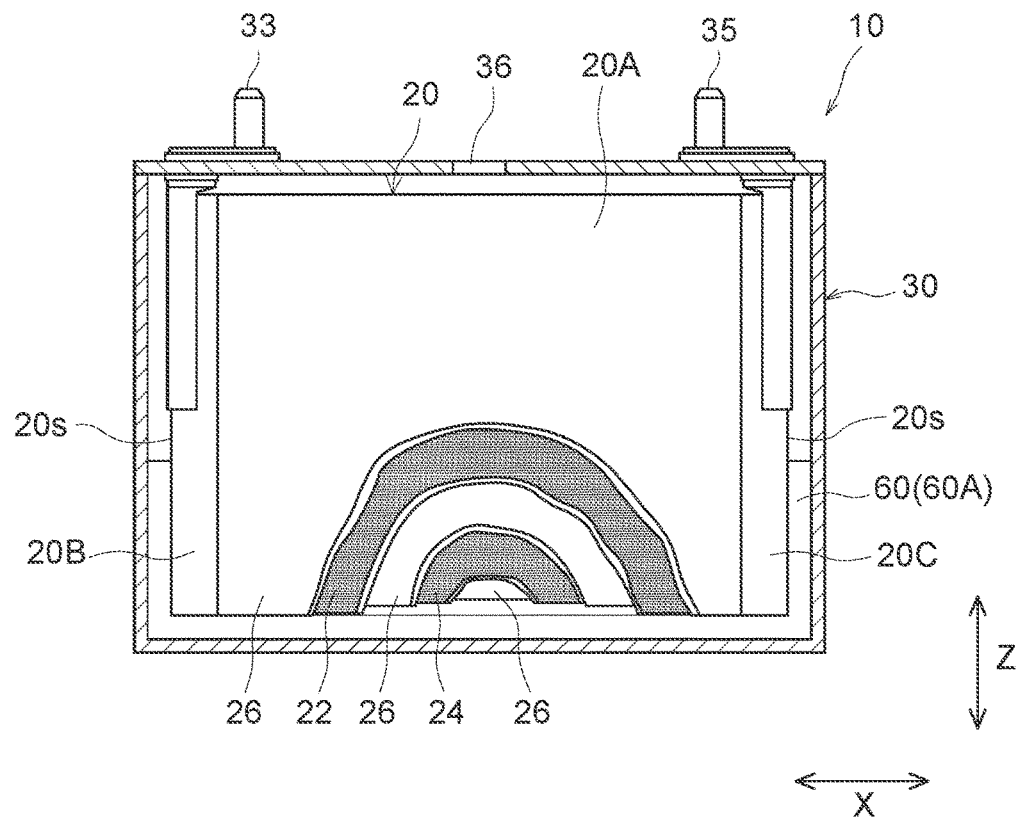
FIG. 3 is a vertical cross-sectional view taken on line of FIG. 2.
Figure 4:
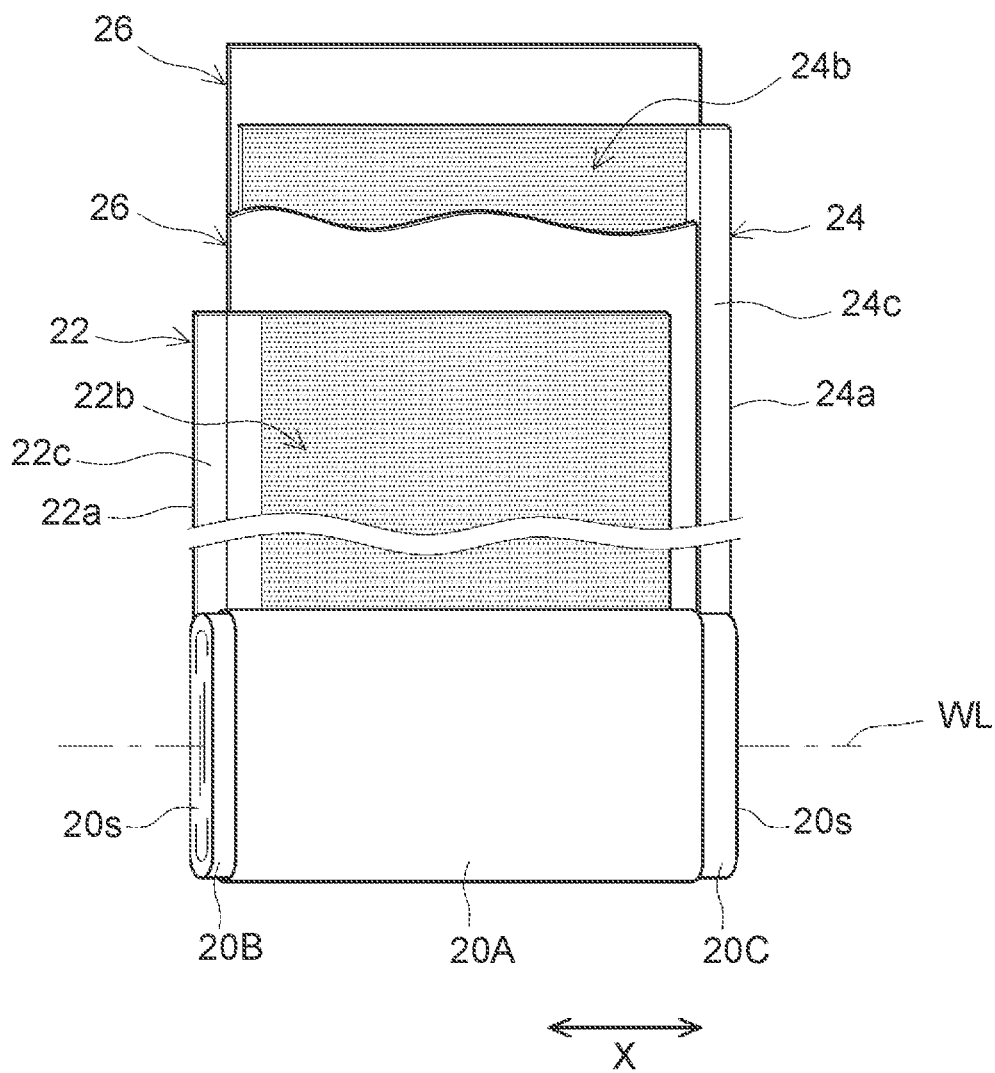
FIG. 4 is a perspective view schematically illustrating an electrode assembly of FIG. 3.
Figure 5:
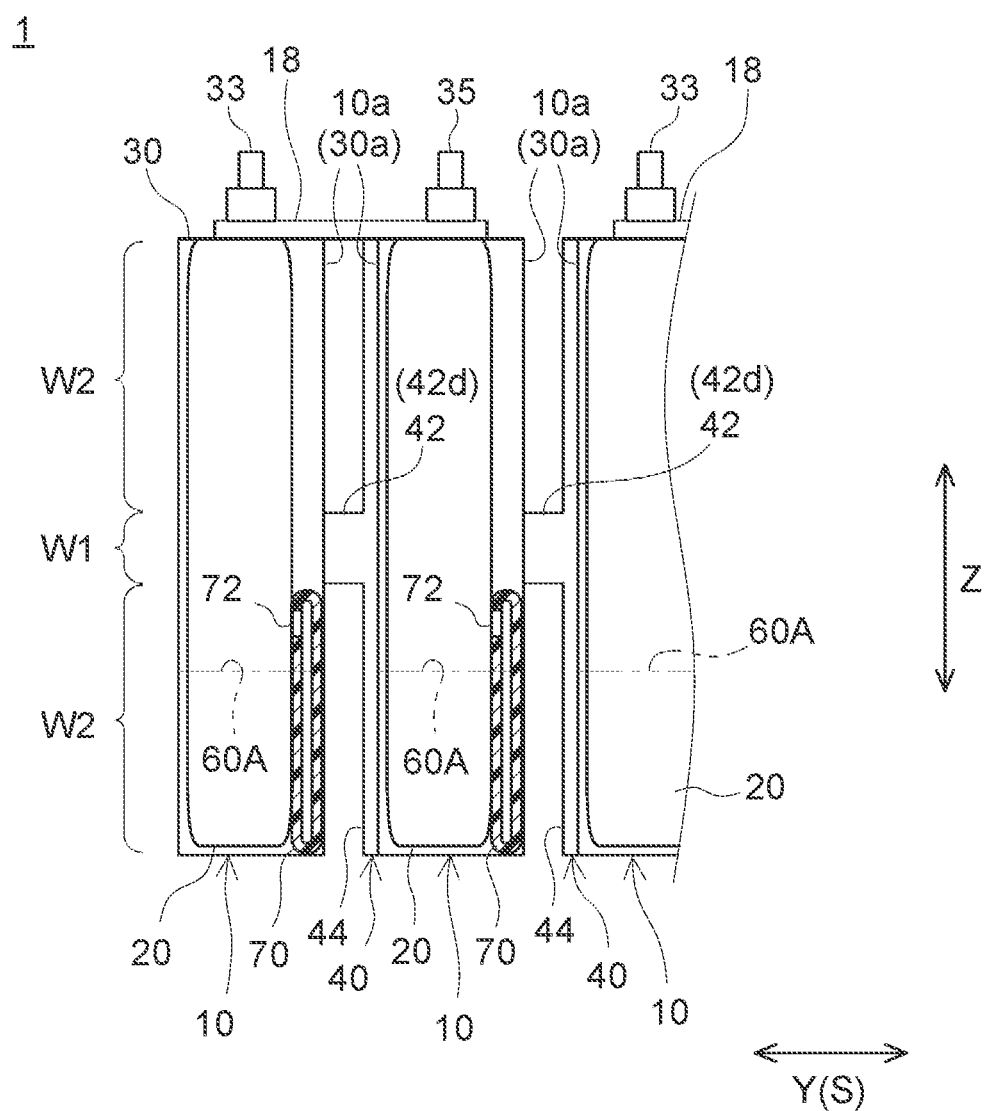
FIG. 5 is a vertical cross-sectional view taken on an alignment direction of the battery pack according to the first embodiment of the present disclosure.

FIG. 1 is a perspective view schematically illustrating a battery pack according to the first embodiment. FIG. 2 is a perspective view schematically illustrating a single cell of FIG. 1. FIG. 3 is a vertical cross-sectional view taken on line of FIG. 2. FIG. 4 is a perspective view schematically illustrating an electrode assembly of FIG. 3. FIG. 5 is a vertical cross-sectional view taken on an alignment direction of the battery pack according to the first embodiment.

(1) Overall Structure of Battery Pack

First, the overall structure of the battery pack 1 of the present embodiment will be described. As illustrated in FIG. 1, in the battery pack 1 of the present embodiment, a plurality of single cells 10 are aligned along a prescribed alignment direction S, and the respective single cells 10 are confined along the alignment direction S. In other words, the battery pack 1 of the present embodiment includes a cell group 10A where the plurality of single cells 10 are aligned, and a confining member 50 confining the cell group 10A.

Each single cell 10 includes a battery case 30 in a flat rectangular shape (typically, a rectangular parallelepiped shape) (see FIG. 2). The respective single cells 10 are aligned to have flat surfaces 30a of the battery cases 30 (in other words, flat surfaces 10a of the single cells 10) facing each other. As a result, in the battery pack 1 of the present embodiment, the single cells 10 are disposed to be aligned in the depth direction Y and the alignment direction S. Besides, the cell group 10A of the battery pack 1 of the present embodiment is constructed by alternately aligning the single cells 10 and spacers 40. Thus, the spacer 40 in a plate shape is disposed in each gap between adjacent ones of the single cells 10.

On the other hand, the confining member 50 includes a pair of end plates 54, and a plurality of confining bands 52. After disposing the cell group 10A between the pair of end plates 54, the pair of end plates 54 are cross-linked by the confining bands 52, and thus, the cell group 10A is confined along the alignment direction S.

(2) Structure of Single Cell

Next, a specific structure of the single cell 10 used in the present embodiment will be described. In the battery pack 1 of the present embodiment, a nonaqueous electrolyte secondary battery is used as the single cell 10. The nonaqueous electrolyte secondary battery is a secondary battery using a nonaqueous electrolyte, and encompasses a lithium ion secondary battery, a nickel-metal hydride battery, an electric double layer capacitor and the like. As illustrated in FIG. 2 to FIG. 4, such a nonaqueous electrolyte secondary battery (single cell 10) includes an electrode assembly 20, a nonaqueous electrolyte 60, and the battery case 30.

(a) Battery Case

The battery case 30 is a housing in which the electrode assembly 20 and the nonaqueous electrolyte 60 are housed. As described above, the battery case 30 is a box-shaped member having a rectangular (rectangular parallelepiped) external shape including the flat surface 30a. Specifically, the battery case 30 includes a case body 32 in a flat rectangular shape having an opening on an upper surface, and a lid 34 corresponding to a plate-shaped member for closing the opening. For the battery case 30, a metallic material having prescribed strength is used. Examples of a material of the battery case 30 include aluminum, iron, and an alloy of these. Besides, the lid 34 is provided with a positive electrode terminal 33 and a negative electrode terminal 35. The positive electrode terminal 33 and the negative electrode terminal 35 are connected between adjacent two single cells 10 through a bus bar 18 (see FIG. 1). Thus, the respective single cells 10 are electrically connected in series to construct the battery pack 1.

Besides, in the lid 34, an injection port 36 to be used for injecting the electrolyte into the battery case 30 is formed. In production of the single cell 10 in the present embodiment, which will be described in detail layer, the electrode assembly 20 is first housed in the battery case 30, and the battery case 30 is evacuated by sucking through the injection port 36 for pressure reduction. Then, after the nonaqueous electrolyte 60 is injected through the injection port 36, the injection port 36 is sealed. Thus, the single cell 10 in which the battery case 30 is sealed is produced.

(b) Electrode Assembly

As illustrated in FIG. 3 and FIG. 4, the electrode assembly 20 includes a positive electrode 22, a negative electrode 24, and a separator 26. The electrode assembly 20 of the present embodiment is a wound electrode assembly. Such a wound electrode assembly is obtained by producing a laminate of the positive electrode 22 and the negative electrode 24 with the separator 26 disposed therebetween, and winding the laminate around a winding axis WL. It is noted that the structure of the electrode assembly according to the techniques disclosed herein can be applied not only to the wound electrode assembly but also to any of conventionally known structures without limitation. Another example of the structure of the electrode assembly includes a stacked electrode assembly in which a plurality of positive electrodes and negative electrodes are alternately stacked with a separator disposed therebetween. There is, however, tendency that a negative pressure within the electrode assembly is difficult to remove in the wound electrode assembly because upper and lower sides in the height direction Z are sealed. According to the techniques disclosed herein, a negative pressure within such a wound electrode assembly can be suitably removed, and hence, the techniques are particularly suitably applied to a battery pack using, as a single cell, a nonaqueous electrolyte secondary battery including a wound electrode assembly.

As illustrated in FIG. 4, the positive electrode 22 includes a foil-shaped positive electrode current collector 22a, and a positive electrode mixture layer 22b coated on a surface (both surfaces) of the positive electrode current collector 22a. Besides, in one side edge portion along the width direction X of the positive electrode 22, a positive electrode exposed portion 22c where the positive electrode mixture layer 22b is not coated but the positive electrode current collector 22a is exposed is formed. On the other hand, the negative electrode 24 includes a foil-shaped negative electrode current collector 24a, and a negative electrode mixture layer 24b coated on a surface (both surfaces) of the negative electrode current collector 24a. In one side edge portion along the width direction X of the negative electrode 24, a negative electrode exposed portion 24c where the negative electrode mixture layer 24b is not coated but the negative electrode current collector 24a is exposed is formed. Materials of the positive electrode 22 and the negative electrode 24 are not herein described in detail because those generally used in nonaqueous electrolyte secondary batteries can be used without particular limitation.

In this electrode assembly 20, as illustrated in FIG. 3, a core part 20A, in which the positive electrode mixture layer 22b and the negative electrode mixture layer 24b face each other with the separator 26 disposed therebetween, is formed at a center along the width direction X. This core part 20A corresponds to a place where a charge/discharge reaction of the electrode assembly 20 is performed. Besides, in one edge portion (on the left side in the drawing) in the width direction X, a positive electrode connection portion 20B where the positive electrode exposed portion 22c alone is wound is formed. To this positive electrode connection portion 20B, the positive electrode terminal 33 is connected. In addition, in the other edge portion (on the right side in the drawing) in the width direction X, a negative electrode connection portion 20C where the negative electrode exposed portion 24c alone is wound is formed. To this negative electrode connection portion 20C, the negative electrode terminal 35 is connected. Besides, side surfaces 20s of the electrode assembly 20 on both sides in the width direction X are opened such that the nonaqueous electrolyte 60 can move in or out of the electrode assembly 20 through the side surfaces 20s on both sides.

(c) Nonaqueous Electrolyte

The nonaqueous electrolyte 60 is a liquid electrolyte containing an organic solvent (nonaqueous solvent), and corresponds to a place where a charge carrier (such as a lithium ion) moves between the positive electrode 22 and the negative electrode 24. Most of the nonaqueous electrolyte 60 permeates into the electrode assembly 20 (namely, between the positive electrode 22 and the negative electrode 24). On the other hand, in the present embodiment, a redundant electrolyte 60A not permeating into the electrode assembly 20 is present outside the electrode assembly 20 (namely, between the electrode assembly 20 and the battery case 30). Therefore, when the amount of the nonaqueous electrolyte 60 present inside the electrode assembly 20 is reduced, the redundant electrolyte 60A can be supplied into the electrode assembly 20. Also materials of the nonaqueous electrolyte 60 are not herein described in detail because those generally used in nonaqueous electrolyte secondary batteries can be used without particular limitation.

(3) Structure of Spacer

Next, the spacer 40 (see FIG. 1) disposed in each gap between the adjacent ones of the single cells 10 will be described. The spacer 40 adjusts the confining pressure applied to each single cell 10 as well as plays a role as a heat radiating plate diffusing heat generated in the single cell 10. Examples of a material of the spacer 40 include resin materials such as polypropylene (PP) and polyphenylene sulfide (PPS). Alternatively, in consideration of a heat radiation property, a metal material having good thermal conductivity can be used.

In the present embodiment, as illustrated in FIG. 5, a convex rib 42 is formed in a part of the surface of the spacer 40. Specifically, the spacer 40 of the present embodiment includes a plate-shaped base portion 44, and the rib 42 projecting from the surface of the base portion 44 in the alignment direction S (depth direction Y). When the spacer 40 having the rib 42 is disposed between the single cells 10, the rib 42 comes into contact with the flat surface 10a of the single cell 10 (in other words, the flat surface 30a of the battery case 30). Therefore, a region, in the flat surface 10a of the single cell 10, in contact with the rib 42 corresponds to a confined region W1 to which the confining pressure is applied, and a region not in contact with the rib 42 corresponds to a non-confined region W2 to which the confining pressure is not applied.

Figure 6:
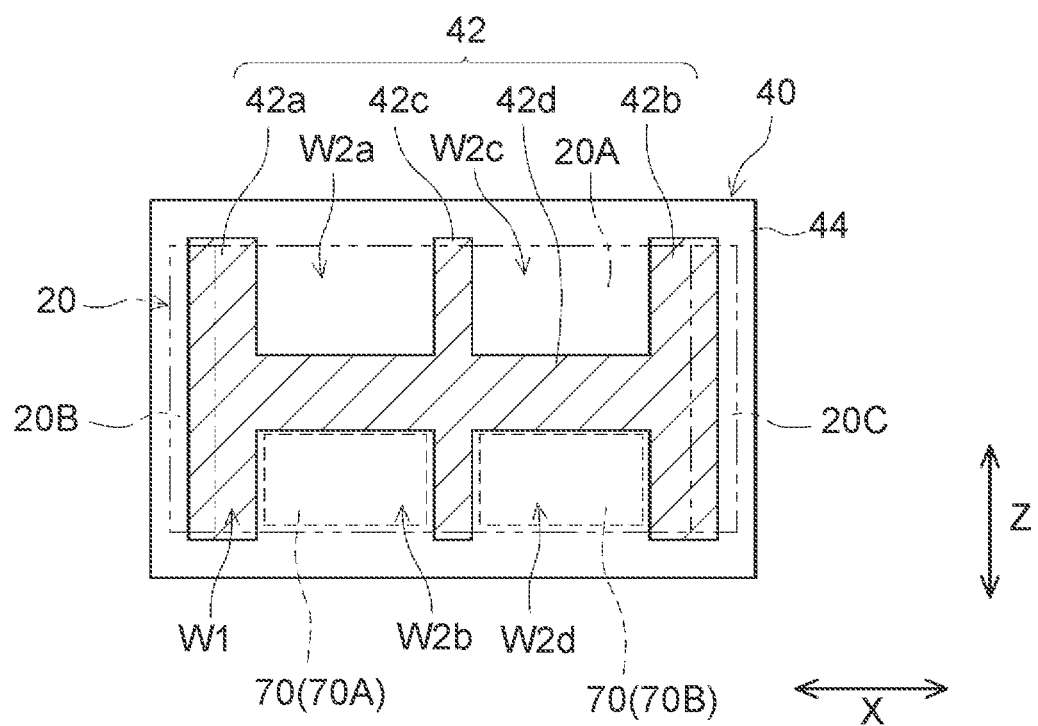
FIG. 6 is a plan view schematically illustrating a spacer used in the first embodiment of the present disclosure.

The confined region W1 functions as a stopper for regulating movement of the nonaqueous electrolyte 60, and the non-confined region W2 functions as an electrolyte holding space (electrolyte reservoir) for holding the nonaqueous electrolyte 60. This will be described with reference to FIG. 6. FIG. 6 is a plan view schematically illustrating the spacer used in the first embodiment. In FIG. 6, a dotted line indicates the position of an internal pressure adjusting bag 70 relative to the spacer 40, and a two-dot chain line indicates the position of the electrode assembly 20 relative to the spacer 40.

First, as illustrated in FIG. 6, four ribs 42a to 42d are formed on the spacer 40 of the present embodiment. Each of the ribs 42a to 42d is a ridge extending in a prescribed direction in a plan view. Specifically, the spacer 40 includes the ribs 42a, 42b extending in the height direction Z in end portions in the width direction X, the rib 42c extending in the height direction Z in a center portion in the width direction X, and the rib 42d extending in the width direction X in a center portion in the height direction Z. On the flat surface 10a of the single cell 10, a confined region W1 (hatched region in FIG. 6) corresponding to the ribs 42a to 42d is formed. In the present embodiment, the confined region W1 formed by the ribs 42a, 42b disposed in both end portions in the width direction X overlaps with both edge portions of the core part 20A of the electrode assembly 20. Thus, the nonaqueous electrolyte having permeated into the core part 20A is regulated so as not to flow out, and hence, the center of the core part 20A corresponding to a non-confined region W2 works as the electrolyte holding space for holding the nonaqueous electrolyte. Besides, in the present embodiment, the confined region W1 is formed so as to press, in a cross shape, the center of the core part 20A by the ribs 42c, 42d. The confined region W1 formed at the center of the core part 20A can inhibit deformation, such as a local gap or waviness otherwise caused by expansion/shrinkage of the positive electrode 22 and the negative electrode 24.

(4) Internal Pressure Adjusting Bag

In the battery pack 1 of the present embodiment, as illustrated in FIG. 5, the internal pressure adjusting bag 70 is housed in the battery case 30 of the single cell 10. The internal pressure adjusting bag 70 is a bag-shaped member filled with a gas. Each single cell 10 included in the battery pack 1 of the present embodiment has a function (gas supplying means) to remove a negative pressure within the battery case 30 by supplying the gas from the internal pressure adjusting bag 70, which will be described in detail later. Besides, as illustrated in FIG. 5 and FIG. 6, the internal pressure adjusting bag 70 is disposed in a part of the non-confined region W2. Thus, a negative pressure in the vicinity of the non-confined region W2 can be suitably removed, and thus, electrolyte retention in the non-confined region W2 can be sufficiently assured. Therefore, the battery pack 1 of the preset embodiment can suitably prevent deterioration of high-rate performance otherwise caused by the outflow of the nonaqueous electrolyte 60 to the outside of the electrode assembly 20.

Now, the internal pressure adjusting bag 70 will be specifically described. As illustrated in FIG. 5, the internal pressure adjusting bag 70 is disposed between the electrode assembly 20 and the battery case 30 so as to face the inner surface of the flat surface 30a of the battery case 30. Besides, in the present embodiment, as illustrated in FIG. 6, two internal pressure adjusting bags 70A, 70B are used. One internal pressure adjusting bag 70A is disposed in a lower non-confined region W2b out of non-confined regions W2a, W2b surrounded by the confined region W1 formed by the ribs 42a, 42c, 42d. The other internal pressure adjusting bag 70B is disposed in a lower non-confined region W2d out of non-confined regions W2c, W2d surrounded by the confined region W1 formed by the ribs 42b, 42c, 42d. In other words, both the internal pressure adjusting bags 70A, 70B of the present embodiment are disposed in the non-confined regions W2 on the lower side in the height direction Z. According to examination made by the present inventors, the electrode assembly 20 tends to easily have a negative pressure on the lower side in the height direction Z as compared with an upper side. From the viewpoint of suitably remove a negative pressure generated on the lower side of the electrode assembly 20, the internal pressure adjusting bag 70 is preferably disposed on the lower side in the height direction Z. Besides, when the internal pressure adjusting bag 70 is disposed on the lower side in the height direction Z, an effect of inhibiting positional shift otherwise caused by gravity can be also obtained.

The internal pressure adjusting bag is, however, not limited to the position illustrated in FIG. 6 as long as it is disposed at least in a part of the non-confined region. For example, the internal pressure adjusting bag may be disposed in a non-confined region formed on the upper side in the height direction. Also in this case, a negative pressure within the battery case can be removed to prevent the deterioration of the electrolyte retention within the electrode assembly. Besides, there is no need to dispose the entire internal pressure adjusting bag in the non-confined region but a part of the internal pressure adjusting bag may be disposed in the confined region, which will be described in detail later in a fourth embodiment. Furthermore, the number of internal pressure adjusting bags contained in the battery case of one single cell is not especially limited, and can be increased/decreased if necessary.

For the internal pressure adjusting bag 70, a material insoluble in the nonaqueous electrolyte is used. Examples of the material insoluble in the nonaqueous electrolyte include resin materials such as polypropylene (PP), polyethylene (PE), perfluoroalkoxy alkane (PFA), polyphenylene sulfide (PPS), polyimide (PI), and polyethylene naphthalate (PEN). The gas held in the internal pressure adjusting bag 70 is preferably a gas not inhibiting a charge/discharge reaction of the single cell 10. Examples include nitrogen ($N_2$), helium (He), and argon (Ar). Besides, if a moisture is supplied into the electrode assembly 20, there is a risk that a charge/discharge reaction may be inhibited. Therefore, the gas held in the internal pressure adjusting bag 70 preferably contains substantially no moisture. Specifically, a water content in the gas is preferably 0.5 g/$m^3$ or less, more preferably 0.1 g/$m^3$ or less, further preferably 0.05 g/$m^3$ or less, and particularly preferably 0.01 g/$m^3$ or less.

Besides, from the viewpoint of suitably removing a negative pressure within the battery case 30, the pressure of the gas within the internal pressure adjusting bag 70 is preferably equal to or higher than standard atmospheric pressure (101.325 kPa). In addition, from the viewpoint of more efficiently removing a negative pressure, the pressure of the gas is more preferably 105 kPa or more, further preferably 110 kPa or more, and particularly preferably 120 kPa or more. Besides, the upper limit of the pressure of the gas is not especially limited as long as the internal pressure adjusting bag 70 is not ruptured during the production, and may be 160 kPa or less, may be 150 kPa or less, and may be 140 kPa or less. Furthermore, a total volume of the internal pressure adjusting bags 70 used in one single cell 10 is preferably 5% or more, more preferably 10% or more, further preferably 15% or more, and particularly preferably 20% or more of the volume of the battery case 30. Thus, a negative pressure within the battery case 30 can be more suitably removed. On the other hand, from the viewpoint of retaining the size of the electrode assembly capable of exhibiting sufficient performance, the upper limit of the total volume of the internal pressure adjusting bags 70 is preferably 35% or less, more preferably 30% or less, further preferably 27% or less, and particularly preferably 25% or less of the volume of the battery case 30.

(5) Gas Supplying Means

The battery pack disclosed herein includes gas supplying means for supplying, to an internal space of the battery case 30 having been sealed, the gas held in the internal pressure adjusting bag 70. A specific structure of the gas supplying means is not especially limited, and any of various structures, such as a structure in which the internal pressure adjusting bag is broken by physical action, and a structure in which the internal pressure adjusting bag is opened by chemical action, can be employed.

For example, in the present embodiment, a soluble part 72 formed in a part of the internal pressure adjusting bag 70 and made of a material soluble in the nonaqueous electrolyte (nonaqueous solvent) is employed as the gas supplying means (see FIG. 5). When this soluble part 72 is dissolved in the redundant electrolyte 60A present outside the electrode assembly 20, the internal pressure adjusting bag 70 is opened, so as to supply the gas to the internal space of the battery case 30. Examples of a material of the soluble part 72 include polystyrene (PS), polyvinyl chloride (PVC), polyamide (PA), polyurethane, and an epoxy resin.

Besides, in the present embodiment, the soluble part 72 is formed on an upper side in the height direction Z of the internal pressure adjusting bag 70 as illustrated in FIG. 5. Specifically, the soluble part 72 of the present embodiment is formed to be positioned above a liquid surface of the redundant electrolyte 60A in the height direction Z. Thus, the soluble part 72 can be prevented from dissolving before sealing the battery case 30 and allowing the gas held in the internal pressure adjusting bag 70 to leak out of the battery case 30. When the soluble part 72 is formed in the position as in the present embodiment, it is preferable to perform a step of bringing the redundant electrolyte 60A and the soluble part 72 into contact with each other by tilting the single cell 10 (or the battery pack 1) after sealing the battery case 30. Thus, the gas can be supplied from the internal pressure adjusting bag 70 after sealing the battery case 30. It is noted that the position of the soluble part is not limited to that illustrated in FIG. 5. Even when the soluble part is formed below the liquid surface of the redundant electrolyte, the internal pressure adjusting bag can be opened after sealing the battery bag by adjusting the material and the thickness of the soluble part, time from the injection of the electrolyte to the sealing of the battery case, and the like. From this point of view, a form in which the entire internal pressure adjusting bag is made of a material soluble in the nonaqueous electrolyte (soluble part) can be employed.

In the battery pack 1 in which the soluble part 72 has been dissolved, it can be determined, by performing elemental analysis of the nonaqueous electrolyte 60 by inductivity coupled plasma (IPC) analysis, liquid chromatography or the like, whether or not the soluble part 72 has been formed. For example, when polyvinyl chloride (PVC) is used as the material of the soluble part 72, chlorine (Cl) that is a characteristic element derived from the PVC is found by the elemental analysis of the nonaqueous electrolyte 60.

2. Other Embodiments

The first embodiment of the techniques disclosed herein has been described so far. As described above, however, the gas supplying means used in the battery pack disclosed herein is not limited to the structure described in the first embodiment in which the soluble part 72 is formed, but any of various structures can be employed. Now, battery packs according to second to fourth embodiments respectively employing gas supplying means having different structures from that of the first embodiment will be described.

(1) Second Embodiment

Figure 7:
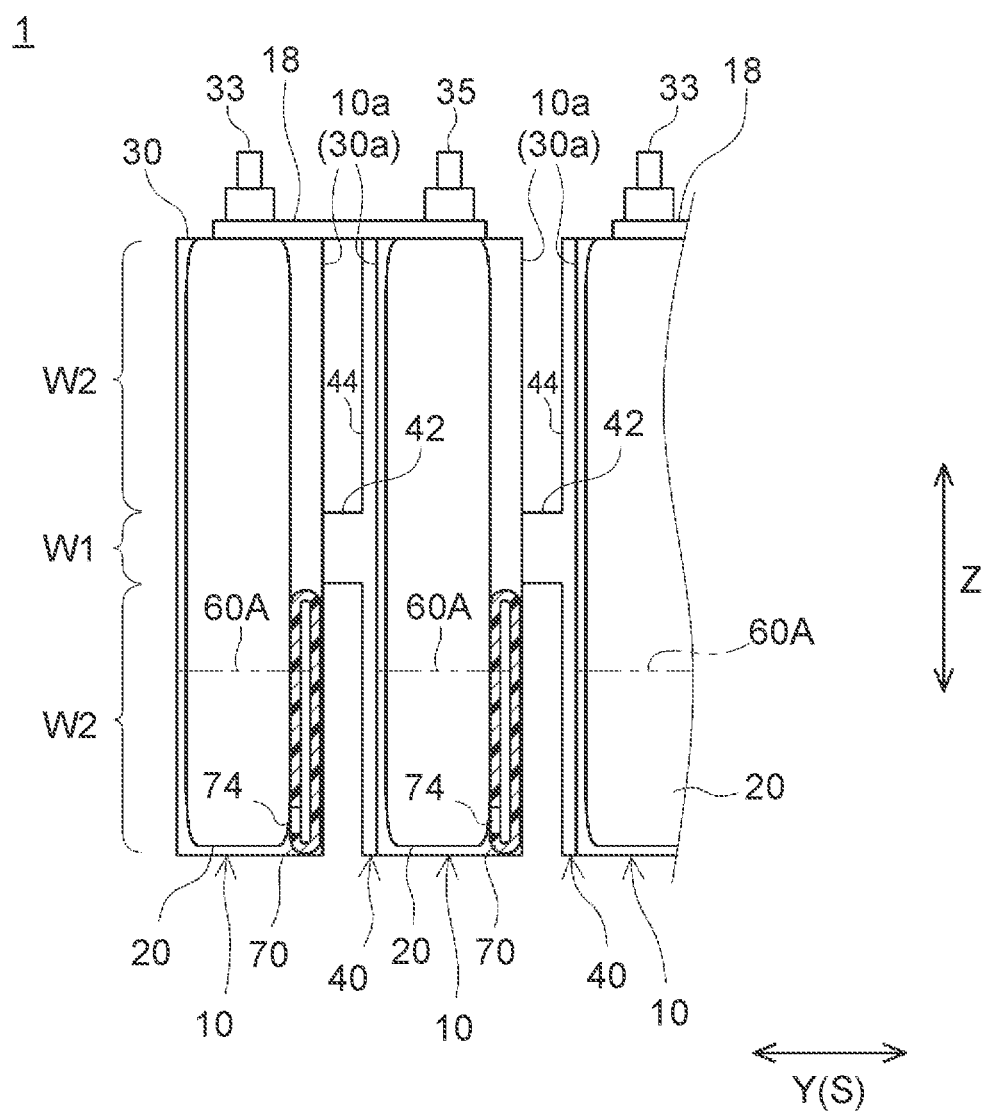
FIG. 7 is a vertical cross-sectional view taken on an alignment direction of a battery pack according to a second embodiment of the present disclosure.

FIG. 7 is a vertical cross-sectional view taken on an alignment direction of a battery pack according to the second embodiment. Gas supplying means of the present embodiment is a gas permeable part 74 formed from a material having gas permeability. An internal pressure adjusting bag 70 including this gas permeable part 74 continuously gradually supplies a gas through the gas permeable part 74. Thus, the internal pressure of a battery case 30 having been sealed is gradually increased, and hence, a negative pressure within the battery case 30 can be removed before the battery pack 1 is distributed/used. Besides, when the gas permeable part 74 is formed as the gas supplying means as in the present embodiment, it is preferable to perform an aging step after the production of a single cell 10 for retaining the single cell 10 for a prescribed period of time under a high temperature environment. Thus, the gas supply through the gas permeable part 74 is accelerated, and hence a negative pressure within the battery case 30 can be more efficiently removed.

A material of the gas permeable part 74 is preferably appropriately selected in accordance with the type of gas held in the internal pressure adjusting bag 70. For example, the gas permeable part 74 is formed preferably from a material having gas permeability, for the gas held in the internal pressure adjusting bag 70, of 500 cc/m$^2$ or more (more preferably 1000 cc/m$^2$ or more, 1200 cc/m$^2$ or more, or 1500 cc/m$^2$ or more). Thus, the gas supply efficiency through the gas permeable part 74 can be improved. On the other hand, an upper limit of the gas permeability of the gas permeable part 74 is not especially limited, and may be 3000 cc/m$^2$ or less. From the viewpoint of reducing gas leakage before sealing the battery case 30, however, the upper limit of the gas permeability of the gas permeable part 74 is preferably 2500 cc/m$^2$ or less, more preferably 2300 cc/m$^2$ or less, further preferably 2100 cc/m$^2$ or less, and particularly preferably 2000 cc/m$^2$ or less. Examples of a material meeting such gas permeability include low density polyethylene, stretched polyethylene, and polymethyl pentene.

Besides, the gas permeable part 74 illustrated in FIG. 7 is formed in a lower portion in the height direction Z of the internal pressure adjusting bag 70. The position of the gas permeable part 74 is, however, not especially limited. Differently from the soluble part 72 (see FIG. 5), however, the gas permeable part 74 can be disposed below a liquid surface of a redundant electrolyte 60A without special design examination. As described above, there is a high possibility that the electrode assembly 20 has a negative pressure on a lower side in the height direction Z as compared with an upper side. In consideration of these, when the gas permeable part 74 is formed as the gas supplying means, the gas permeable part 74 is formed preferably in the lower portion of the internal pressure adjusting bag 70 in the height direction Z as illustrated in FIG. 7. It is noted that the entire internal pressure adjusting bag 70 may be made of a material having gas permeability (gas permeable part 74) depending on the pressure and the volume of the gas, and the like.

(2) Third Embodiment

Figure 8:
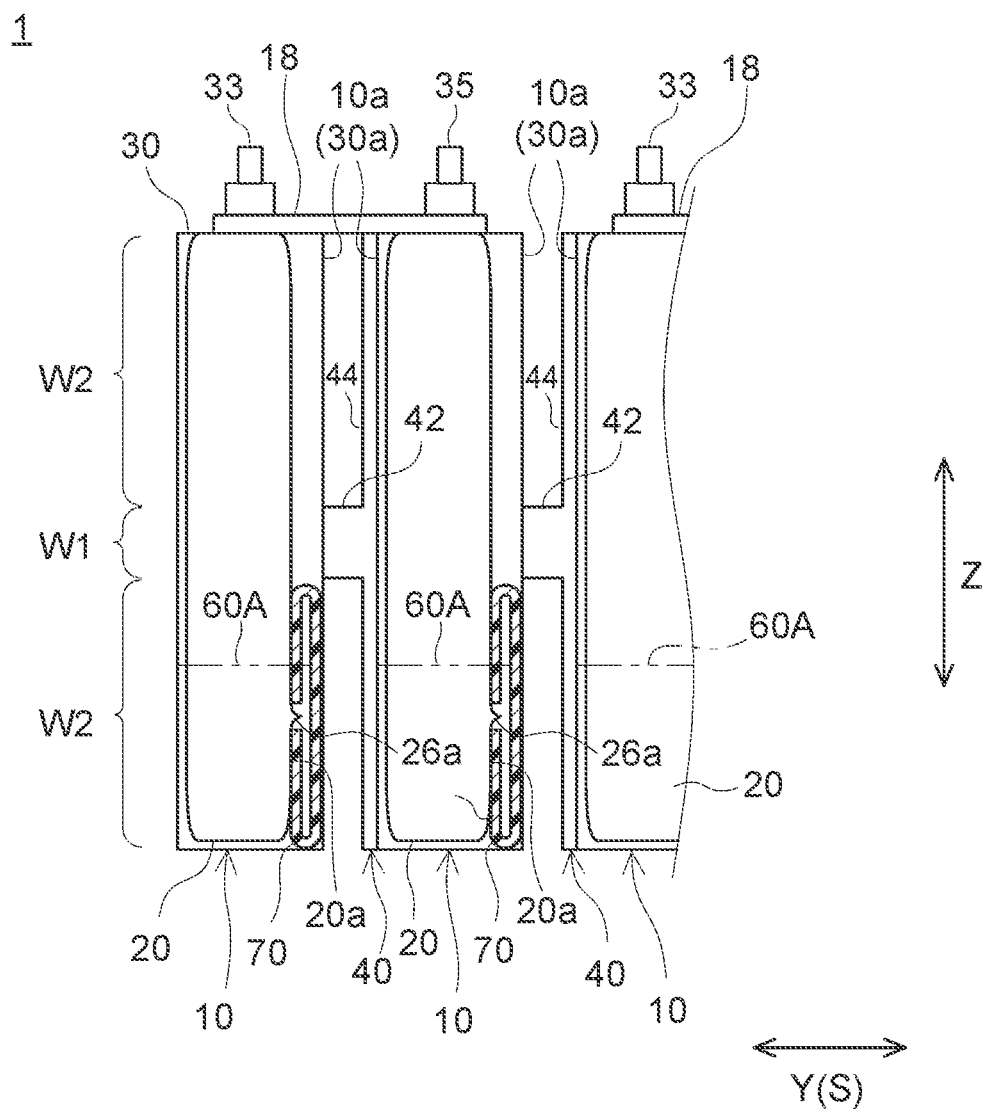
FIG. 8 is a vertical cross-sectional view taken on an alignment direction of a battery pack according to a third embodiment of the present disclosure.

FIG. 8 is a vertical cross-sectional view taken on an alignment direction of a battery pack according to the third embodiment. The battery pack 1 of the present embodiment includes, as gas supplying means, a projection 26a having a sharp tip formed on an outer surface 20a of an electrode assembly 20 facing an internal pressure adjusting bag 70. Specifically, a separator 26 is disposed on an outer surface of an electrode assembly 20 of a general nonaqueous electrolyte secondary battery for preventing a positive electrode mixture layer 22b and a negative electrode mixture layer 24b (see FIG. 4) from dropping off. Since the outer surface 20a of the electrode assembly 20 constructed by the separator 26 does not make contribution to a charge/discharge reaction, a member in a desired shape can be easily formed as the outer surface. When the projection 26a having a sharp tip is formed on the outer surface 20a of the electrode assembly 20 to allow the projection 26a to break the internal pressure adjusting bag 70, a gas can be definitely supplied to an internal space of a battery case 30. In the present embodiment, after sealing the battery case 30, the battery case 30 is pressed from outside in a position corresponding to the projection 26a. Thus, the gas supply can be started at desired timing without leaking the gas before sealing the battery case 30.

In the third embodiment, the projection 26a is formed on the outer surface 20a of the electrode assembly 20. The projection may be, however, formed on a member except for the electrode assembly as long as the internal pressure adjusting bag can be broken at desired timing. For example, an insulating film is disposed between the electrode assembly and the battery case in a general nonaqueous electrolyte secondary battery for preventing electrical conduction to the battery case, and a sharp projection may be formed on the insulating film. Also when such a structure is employed, the gas supply can be started by breaking the internal pressure adjusting bag by pressing the battery case from outside in the position corresponding to the projection. From the viewpoint of definitely preventing the electrode assembly from being damaged by the projection, however, the projection 26*a* is formed preferably on the outer surface 20*a* of the electrode assembly 20 as in the third embodiment.

(3) Fourth Embodiment

Figure 9:
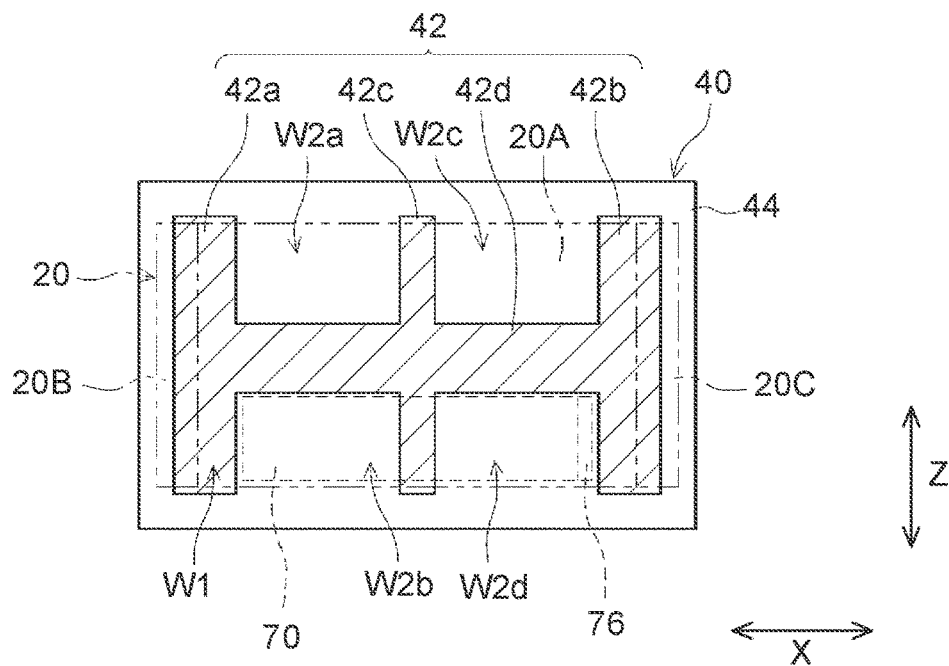
FIG. 9 is a plan view schematically illustrating a spacer used in a fourth embodiment of the present disclosure.

FIG. 9 is a plan view schematically illustrating a spacer used in the fourth embodiment. As illustrated in FIG. 9, in a battery pack of the present embodiment, a cleavable part 76 to be cleaved in response to increase of the internal pressure of an internal pressure adjusting bag 70 is provided as gas supplying means. This cleavable part 76 is formed to have lower strength than another region of the internal pressure adjusting bag 70. For example, the internal pressure adjusting bag 70 is formed by welding outer peripheries of two films of a resin material. Here, the cleavable part 76 having lower strength than the other region can be formed by narrowing a part of the welded region. In the present embodiment, a part of the internal pressure adjusting bag 70 is disposed in a confined region W1 formed by a rib 42*c* formed at a center in the width direction X. Thus, the internal pressure adjusting bag 70 is squashed by the rib 42*c* in confining a single cell, and thus, the internal pressure of the internal pressure adjusting bag 70 is increased. As a result, the cleavable part 76 having lower strength than the other region is cleaved, so as to supply a gas to an internal space of the battery case 30.

(4) Other Modifications

It is noted that other structures can be appropriately modified, in addition to the structure of the gas supplying means, in the battery pack disclosed herein. For example, the spacer 40 used in the first to fourth embodiments described above includes the four ribs 42*a* to 42*d* extending in the prescribed directions as illustrated in FIG. 6 and FIG. 9. The shape, the number and the position of each rib are not especially limited but can be appropriately modified. For example, in the battery pack disclosed herein, any of spacers 40A to 40D respectively having structures illustrated in FIG. 10 to FIG. 13 can be used.

Figure 10:
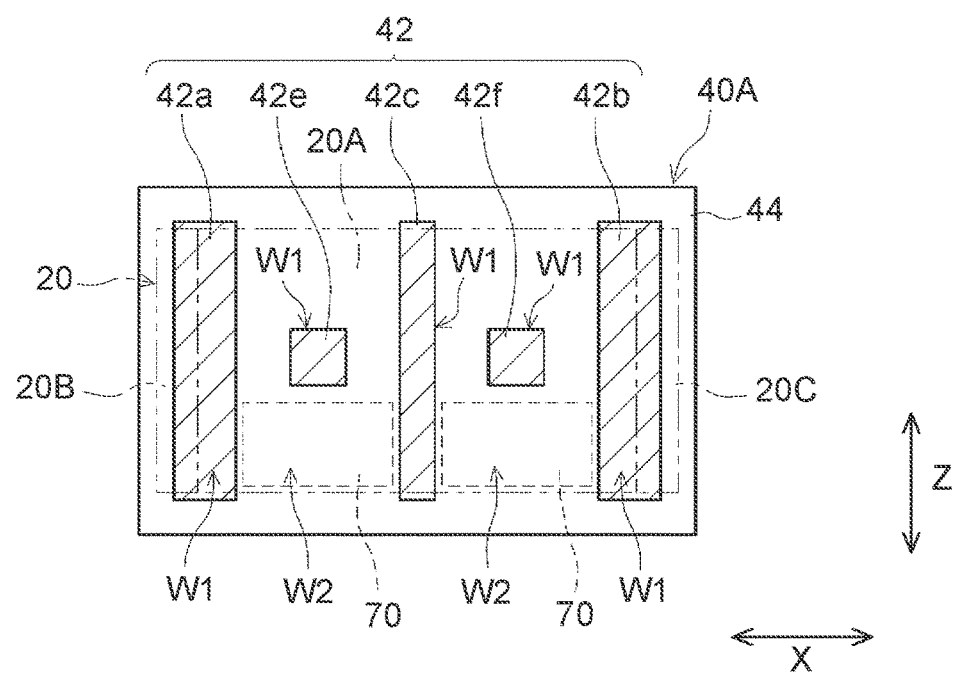
FIG. 10 is a plan view schematically illustrating another example of the spacer.

For example, in the spacer 40A illustrated in FIG. 10, two ribs 42*e*, 42*f* pressing points in the vicinity of the center of the core part 20A of the electrode assembly 20 are formed instead of the rib 42*d* (see FIG. 6 and FIG. 9) extending in the width direction X. The spacer 40A having this structure can inhibit, similarly to the spacer 40 illustrated in FIG. 6 and FIG. 9, deformation such as a local gap or waviness otherwise caused at the center of the core part 20A. Besides, since the non-confined region W2 is formed to communicate between the upper end and the lower end in the height direction Z, the heat radiation efficiency is improved because the air can be easily circulated.

Figure 11:
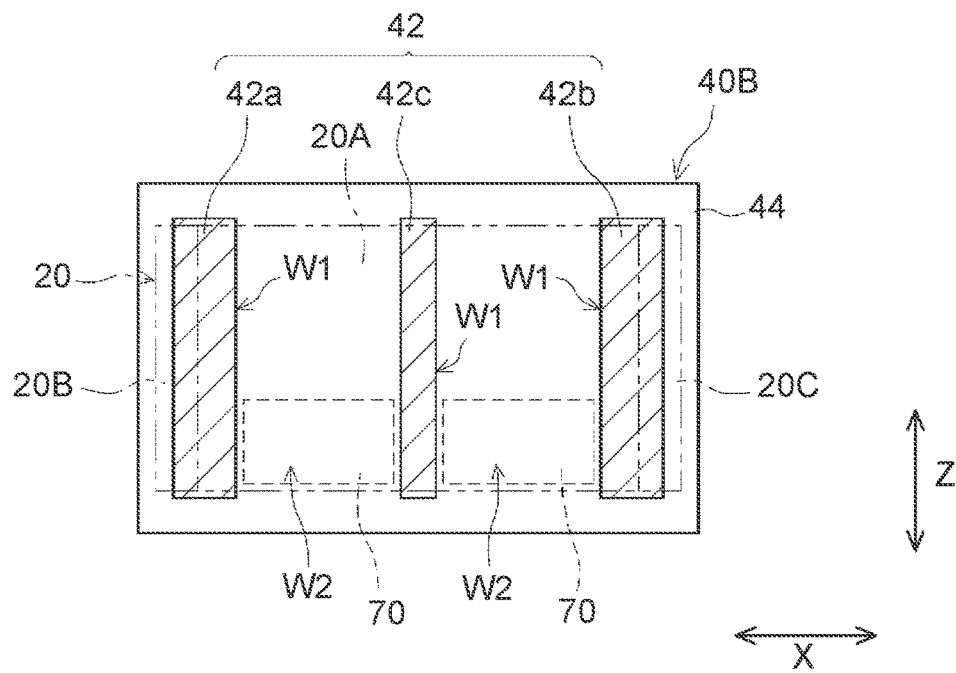
FIG. 11 is a plan view schematically illustrating yet another example of the spacer.

In the spacer 40B illustrated in FIG. 11, merely the ribs 42*a*, 42*b*, 42*c* extending in the height direction Z are formed without forming the rib 42*d* (see FIG. 6) extending in the width direction X. Also when the spacer 40B in this shape is provided, the electrolyte can be held in the non-confined region W2. Besides, similarly to the spacer 40A illustrated in FIG. 10, the heat radiation efficiency can be improved. From the viewpoint of inhibiting the deformation of the electrode assembly 20 at the center of the core part 20A, the spacer 40 illustrated in FIG. 6 and FIG. 9 is preferred.

Figure 12:
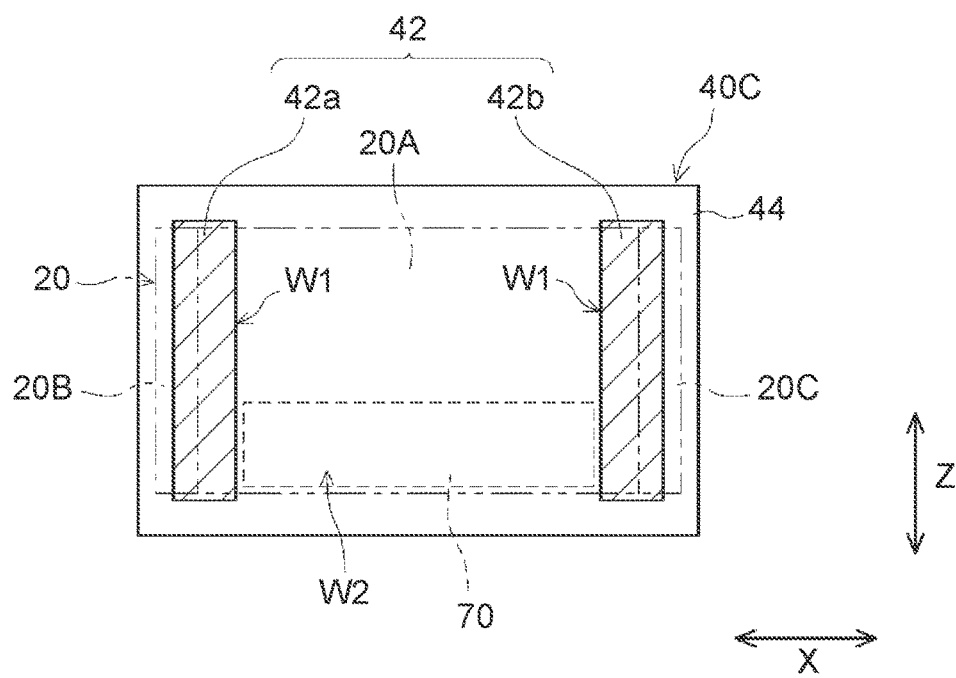
FIG. 12 is a plan view schematically illustrating yet another example of the spacer.

Alternatively, the spacer 40C in which only the ribs 42*a*, 42*b* are formed to extend in the height direction Z in both edge portions in the width direction as illustrated in FIG. 12 can be used. When the ribs 42 are formed to form the confined regions W1 in both edge portions of the core part 20A as the ribs 42*a*, 42*b*, the electrolyte holding space can be formed at least in the core part 20A. From the viewpoints of inhibiting the deformation of the electrode assembly 20 and making a distance uniform between the electrodes, however, a rib pressing the center of the core part 20A may be formed in addition to the ribs pressing both edge portions of the core part 20A.

Alternatively, even when the ribs pressing the entire regions of both edge portions in the width direction X of the core part 20A (namely, the ribs 42*a*, 42*b* illustrated in FIG. 6, and FIG. 10 to FIG. 12) are not formed, the effect of preventing the outflow of the electrolyte according to the present disclosure can be appropriately exhibited. For example, in the spacer 40D illustrated in FIG. 13, a plurality of ribs 42 are disposed in the shape of comb teeth, and no rib is formed in a region to be brought into contact with a lower portion of the center in the width direction X of the core part 20A. Also when the spacer 40D having this structure is used, the confined regions W1 are formed in both edge portions in the width direction X of the core part 20A, and the non-confined region W2 is formed in the lower portion of the center in the width direction X of the core part 20A, and therefore, the electrolyte can be held in the non-confined region W2. When the internal pressure adjusting bag 70 is disposed in this non-confined region W2, a negative pressure in the non-confined region W2 can be suitably removed by using the gas supplied from the internal pressure adjusting bag 70.

Figure 13:
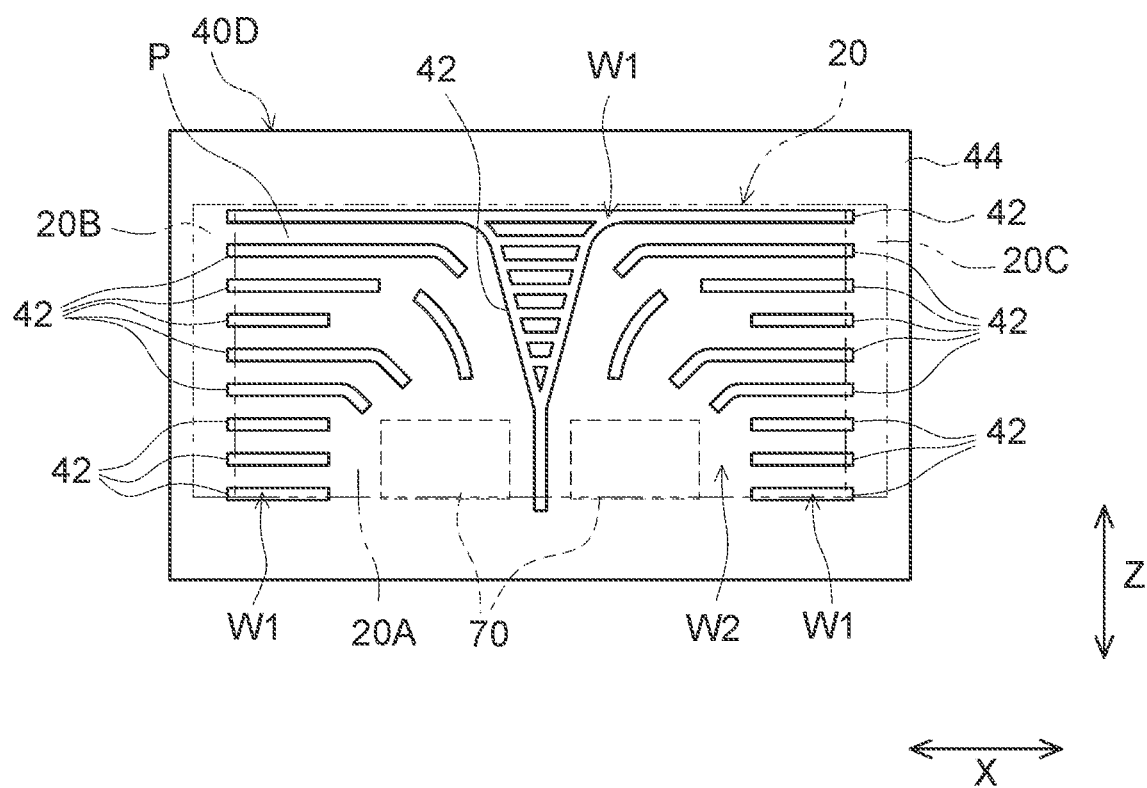
FIG. 13 is a plan view schematically illustrating yet another example of the spacer.

Besides, in the spacer 40D illustrated in FIG. 13, a large number of gaps P are formed between the plurality of ribs 42. Since the outside air can be brought into contact with the entire region of the flat surface 10*a* of the single cell 10 through the gaps P, the heat radiation efficiency can be further improved. Furthermore, since a large number of confined regions W1 are uniformly formed in a region excluding the non-confined region W2 disposed in the lower portion of the center of the core part 20A where the internal pressure adjusting bag 70 is disposed, the distribution of a confining pressure to be applied to the electrode assembly 20 can be made uniform, and variation in the distance between the positive electrode and the negative electrode can be inhibited. Therefore, when the spacer 40D is used, battery performance can be stabilized.

It is noted that a structure related to a portion different from the spacer can be appropriately modified. For example, in the first to fourth embodiments described above, the internal pressure adjusting bag 70 is housed within the battery case 30 in each of the single cells 10 included in the battery pack 1. The internal pressure adjusting bag need not be, however, housed in all the single cells. When the internal pressure adjusting bag is housed in some single cells, the effect of improving the high-rate performance as the whole battery pack can be exhibited.

B. Production Method for Battery Pack

In another aspect of the techniques disclosed herein, a production method for a battery pack is provided. Now, an embodiment of the production method disclosed herein will be described.

The production method according to the present embodiment is a method for producing a battery pack 1 (see FIG. 1) in which a plurality of single cells 10 are aligned along a prescribed alignment direction and the respective single cells 10 are confined along the alignment direction S. This production method includes a housing step, a cell forming step, an aligning step, a confining step, and a gas supplying step. These steps will now be described.

(1) Housing Step

In this step, an electrode assembly 20 is housed in a battery case 30 in a flat rectangular shape (see FIG. 3). Specifically, in this step, the electrode assembly 20 is first inserted through an opening formed on an upper surface of a case body 32. Then, after connecting a positive electrode terminal 33 and a negative electrode terminal 35 provided on a lid 34 to the electrode assembly 20, the opening of the case body 32 is closed by the lid 34. Thus, the electrode assembly is housed in the battery case 30.

In the production method of the present embodiment, an internal pressure adjusting bag 70 (see FIG. 5) is housed in the battery case 30 in performing the housing step. Here, at least a part of the internal pressure adjusting bag 70 is disposed in a non-confined region W2 (see FIG. 6 to FIG. 13). In housing the internal pressure adjusting bag 70, the internal pressure adjusting bag 70 is preferably fixed on a side surface of the electrode assembly 20 by using an adhesive tape or the like. Thus, the internal pressure adjusting bag 70 can be housed in the battery case 30 simultaneously with the electrode assembly 20. Besides, positional shift of the internal pressure adjusting bag 70 otherwise caused after housing can be prevented.

(2) Cell Forming Step

In this step, a nonaqueous electrolyte 60 is injected into the battery case 30 with a pressure within the battery case 30 reduced, and then the battery case 30 is sealed to form a single cell 10. Specifically, a pressure reduction treatment for evacuating the battery case 30 by sucking through an injection port 36 of the lid 34 is first performed. At this point, the pressure reduction treatment is performed preferably in such a manner as to obtain a pressure of about 5 kPa to 20 kPa in the battery case 30. Then, an injection nozzle is provided on the injection port 36, and injection of the electrolyte into the battery case 30 is started with the pressure reduced state kept. Thus, a negative pressure in a space between the battery case 30 and the electrode assembly 20 is removed, but a negative pressure remains between a positive electrode 22 and a negative electrode 24 within the electrode assembly 20. As a result, the nonaqueous electrolyte 60 having been injected into the space between the battery case 30 and the electrode assembly 20 gradually permeates between the positive electrode 22 and the negative electrode 24 (inside the electrode assembly 20). Then, in this step, the injection port 36 of the battery case 30 is kept opened for a prescribed period of time (about 10 seconds to 5 minutes), and then the injection port 36 is sealed. Thus, the single cell 10 including the sealed battery case 30 is produced.

(3) Aligning Step

In this step, the single cell 10 and a spacer 40 having a convex rib 42 formed on a surface thereof are alternately aligned with the rib 42 of the spacer 40 in contact with a flat surface 10a of the single cell 10. Thus, a cell group 10A in which a plurality of single cells 10 are aligned, with the spacers 40 disposed therebetween, along a prescribed alignment direction S is constructed. The positional relationship between the single cell 10 and the spacer 40 in the alignment is not described in detail here because it has been already described above.

(4) Confining Step

In this step, the respective single cells 10 are confined along the alignment direction S. Specifically, after the cell group 10A is disposed between a pair of end plates 54 as described above, the end plates 54 are cross-linked by confining bands 52. Thus, the plurality of single cells 10 are confined along the alignment direction S. At this point, in the present embodiment, since the rib 42 of the spacer 40 is in contact with the flat surface 10a of the single cell 10, a confined region W1 to which a confining pressure is applied, and a non-confined region W2 to which a confining pressure is not applied are formed on the flat surface 10a of the single cell 10.

(5) Gas Supplying Step

In the production method of the present embodiment, the gas supplying step of supplying a gas out of the internal pressure adjusting bag 70 is provided after the cell forming step. In the cell forming step described above, if a sufficient amount of the nonaqueous electrolyte 60 has not permeated into the electrode assembly 20 within a retention time, or if balance between the amount of pressure reduction within the battery case 30 and a supply amount of the electrolyte is lost, the injection port 36 is sealed with a negative pressure remaining in the electrode assembly 20. In the present embodiment, however, a gas can be supplied from the internal pressure adjusting bag 70 disposed in the non-confined region W2 within the battery case 30, and hence the negative pressure within the battery case 30 having been sealed can be removed. Thus, reduction of electrolyte retention within the electrode assembly 20 otherwise caused by self-confinement can be prevented, and a battery pack 1 having high high-rate performance can be produced.

It is noted that details of and timing of performing the gas supplying step are not limited as long as a negative pressure within the battery case 30 can be removed by supplying a gas out of the internal pressure adjusting bag 70. For example, when an internal pressure adjusting bag 70 having the soluble part 72 (see FIG. 5) is used as in the first embodiment, the gas supplying step is performed when the soluble part 72 is dissolved. Although not described here in detail because already described, the timing of dissolving the soluble part 72 can be appropriately adjusted in accordance with the position, the material, the thickness and the like of the soluble part 72. Besides, depending on the position of the soluble part 72, a step of intentionally bringing a redundant electrolyte 60A into contact with the soluble part 72 by tilting the single cell 10 (or the battery pack 1) can be provided as the gas supplying step.

Alternatively, when the gas permeable part 74 is provided as in the second embodiment, a gas is gradually continuously supplied from the gas permeable part 74. Then, a negative pressure within the battery case 30 is gradually removed after sealing the battery case 30 (after the cell forming step), and the negative pressure within the battery case 30 is sufficiently removed before the battery pack 1 having been produced is distributed/used.

Alternatively, when the projection 26a (see FIG. 8) for breaking the internal pressure adjusting bag 70 is formed as in the third embodiment, the gas supplying step is performed when the internal pressure adjusting bag 70 is broken by pressing the region corresponding to the projection 26a. Timing of breaking the internal pressure adjusting bag 70 is not especially limited as long as it is after the cell forming step in which the battery case 30 is sealed. For example, immediately after forming the single cell 10 in the cell forming step, the gas supplying step may be started by pressing the region corresponding to the projection 26a. Alternatively, the gas supplying step can be performed in the confining step at one time in the plurality of single cells 10 included in the battery pack 1. Specifically, a rib for pressing the region corresponding to each projection 26a is formed on each spacer 40, and the gas supplying step can be performed simultaneously on all the single cells 10 by confining the cell group 10A.

Alternatively, when the internal pressure adjusting bag 70 having the cleavable part 76 (see FIG. 9) is used as in the fourth embodiment, the gas supplying step is performed simultaneously with the confining step. Specifically, in this form, the internal pressure adjusting bag 70 is disposed in the confined region W1, and hence an internal pressure of the internal pressure adjusting bag 70 is increased because a confining pressure is applied to the internal pressure adjusting bag 70 in performing the confining step. At this point, the internal pressure adjusting bag 70 has the cleavable part 76 having lower strength than the other portion, and hence the cleavable part 76 is cleaved such that the gas can be supplied from the internal pressure adjusting bag 70.

The present disclosure has been described in detail, and it is noted that the description is merely illustrative and the techniques disclosed herein encompass various modifications and changes of the specific examples described above.

What is claimed is:

1. A battery pack, comprising a plurality of single cells aligned along a prescribed alignment direction with each of the single cells being confined along the alignment direction, each of the single cells being a nonaqueous electrolyte secondary battery comprising an electrode assembly and a nonaqueous electrolyte housed in a battery case in a flat rectangular shape, wherein
   a plate-shaped spacer is disposed in each gap between adjacent ones of the single cells, and a convex rib in contact with a flat surface of the single cell is formed in a part of a surface of the spacer,
   a region, in the flat surface of the single cell, where the rib is in contact is a confined region, and a region where the rib is not in contact is a non-confined region,
   an internal pressure adjusting bag filled with a gas is housed in the battery case of each of at least some of the plurality of single cells, and the internal pressure adjusting bag is disposed in at least a part of the non-confined region,
   the battery pack further comprises a gas supplying device for supplying the gas held in the internal pressure adjusting bag to an internal space of the battery case having been sealed,
   the gas supplying device is a soluble part that is formed in at least a part of the internal pressure adjusting bag, and is made of a material soluble in the nonaqueous electrolyte, and
   a redundant electrolyte not permeating into the electrode assembly is present between the electrode assembly and the battery case.

2. The battery pack according to claim 1, wherein the gas filled in the internal pressure adjusting bag is an inert gas.

3. The battery pack according to claim 1, wherein a water content in the gas filled in the internal pressure adjusting bag is 0.1 g/m$^3$ or less.

4. The battery pack according to claim 1, wherein the electrode assembly includes a core part where a positive electrode mixture layer and a negative electrode mixture layer face each other with a separator disposed between the positive electrode mixture layer and the negative electrode mixture layer, and the rib of the spacer is formed in such a manner that the confined region is formed in both edge portions in a width direction of the core part.

5. A battery pack, comprising a plurality of single cells aligned along a prescribed alignment direction with each of the single cells being confined along the alignment direction, each of the single cells being a nonaqueous electrolyte secondary battery comprising an electrode assembly and a nonaqueous electrolyte housed in a battery case in a flat rectangular shape,
   wherein a plate-shaped spacer is disposed in each gap between adjacent ones of the single cells, and a convex rib in contact with a flat surface of the single cell is formed in a part of a surface of the spacer,
   a region, in the flat surface of the single cell, where the rib is in contact is a confined region, and a region where the rib is not in contact is a non-confined region,
   an internal pressure adjusting bag filled with a gas is housed in the battery case of each of at least some of the plurality of single cells, and the internal pressure adjusting bag is disposed in the non-confined region,
   the battery pack further comprises a gas supplying device for supplying the gas held in the internal pressure adjusting bag to an internal space of the battery case having been sealed, and
   the gas supplying device is a soluble part that is formed in at least a part of the internal pressure adjusting bag, and is made of a material soluble in the nonaqueous electrolyte, and
   a redundant electrolyte not permeating into the electrode assembly is present between the electrode assembly and the battery case.

* * * * *